United States Patent
Hines et al.

(10) Patent No.: US 8,085,281 B2
(45) Date of Patent: Dec. 27, 2011

(54) METHOD OF DISPLAYING INPUT FROM A PORTABLE COMPUTING DEVICE

(75) Inventors: Michael Frederick Hines, Sammamish, WA (US); Michael F. Koenig, Bellevue, WA (US); Tara Prakriya, Redmond, WA (US); Subha Bhattacharyay, Bellevue, WA (US); Anuraag Tiwari, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 808 days.

(21) Appl. No.: 12/117,240

(22) Filed: May 8, 2008

(65) Prior Publication Data

US 2009/0278860 A1 Nov. 12, 2009

(51) Int. Cl.
*G09G 5/00* (2006.01)
*G06F 17/00* (2006.01)
*G06F 3/00* (2006.01)

(52) U.S. Cl. ......... 345/668; 345/660; 345/418; 345/2.3; 715/866

(58) Field of Classification Search .................. 345/660, 345/2.3, 418, 668; 715/864, 866
See application file for complete search history.

(56) References Cited

U.S. PATENT DOCUMENTS

| | | | |
|---|---|---|---|
| 6,611,258 B1 | 8/2003 | Tanaka et al. | |
| 6,930,673 B2 | 8/2005 | Kaye et al. | |
| 2004/0012828 A1* | 1/2004 | Soda | 345/76 |
| 2004/0189677 A1* | 9/2004 | Amann et al. | 345/660 |
| 2005/0179674 A1 | 8/2005 | Mehrotra et al. | |
| 2007/0271525 A1* | 11/2007 | Han et al. | 715/786 |
| 2007/0288937 A1 | 12/2007 | Durojaiye et al. | |
| 2009/0244081 A1* | 10/2009 | Abbas | 345/581 |
| 2010/0134385 A1* | 6/2010 | Roth et al. | 345/2.3 |
| 2010/0265214 A1* | 10/2010 | Green et al. | 345/174 |

OTHER PUBLICATIONS

"Pen and Touch Digitizer Drivers for Windows Vista", http://www.microsoft.com/whdc/device/input/Pen_touch.mspx.
"USBSoftMux Preliminary Data Sheet", http://www.codetelligence.com/productsUSBSOFTMUX.htm.
"Digitizer 3.0 Capture Card", NCast, User Manual, pp. 1-15.
"TNT Products V6.20 New Features", http://www.microimages.com/featupd/V62/.
"Wacom CintiqPartner digitizer", http://www.ciao.co.uk/Wacom_CintiqPartner_Digitiser_5819060.
"Wacom Intuos3 A3 Wide CAD—digitizer, cursor (puck)", http://www.ciao.co.uk/Wacom_Intuos3_Digitiser_Cursor_6478752#productdetail.
"Digitizer Technology Company", http://www.vtablet.com/.

* cited by examiner

*Primary Examiner* — Chante Harrison

(57) ABSTRACT

A method and system is described for displaying input from a portable computing device to a second computing device. On the second computing device, a display region is created. The region may be a stand alone application or a region inside an application. The second computing device then receives a communication that represents the portable input on the portable computing device. The portable input is then scaled to fit the display region and the portable input is displayed on the second computing device.

20 Claims, 5 Drawing Sheets

METHOD OF DISPLAYING INPUT FROM A PORTABLE COMPUTING DEVICE

BACKGROUND

This Background is intended to provide the basic context of this patent application and it is not intended to describe a specific problem to be solved.

Portable computing devices continue to gain in popularity. The uses and usability continues to increase such that many tasks that could only be completed on a personal computer can now be completed on a portable computing device. As a result, more and more information and data is being gathered on portable computing devices. User still often want to move data from portable computing devices for a variety of reasons, from centralized to storage to being able to better examine the data from the portable media device on a larger display.

At the same time, monitor prices for personal computers continues to fall. Monitors get larger and larger and cheaper and cheaper. As a result, users often have large monitors or multiple monitors. Operating system software also continues to increase in functionality to allow the control of large monitors or multiple monitors.

In addition, sometimes users desire to share data with other portable computing devices. The display sizes on these devices also will vary widely. Not surprisingly, users are unsure of how communicated data from a personal computing device with a displayed on a second computing device with a different size monitor.

Challenges arise when moving data from a portable computing device to a personal computer with a large monitor or with multiple monitors. Users often become confused on where data that is communicated to the personal computer will be view, what data will be viewed and what size the data will be when it is communicated from the relatively small display on the portable media player to the larger display (or displays) of a personal computer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method and system is described for displaying input from a portable computing device to a second computing device. On the second computing device, a display region is created. The region may be a stand alone application or a region inside an application. The second computing device then receives a communication that represents the portable input on the portable computing device. The portable input is then scaled to fit the display region and the portable input is displayed on the second computing device. The scaling may occur in a variety of ways, such as having a length adjustment factor, a width adjustment factor and a resolution adjustment factor. As a result of the system and method, portable input from the portable computing device will be displayed in a controlled manner, in a designated display region, rather than filling up an entire display or displays.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
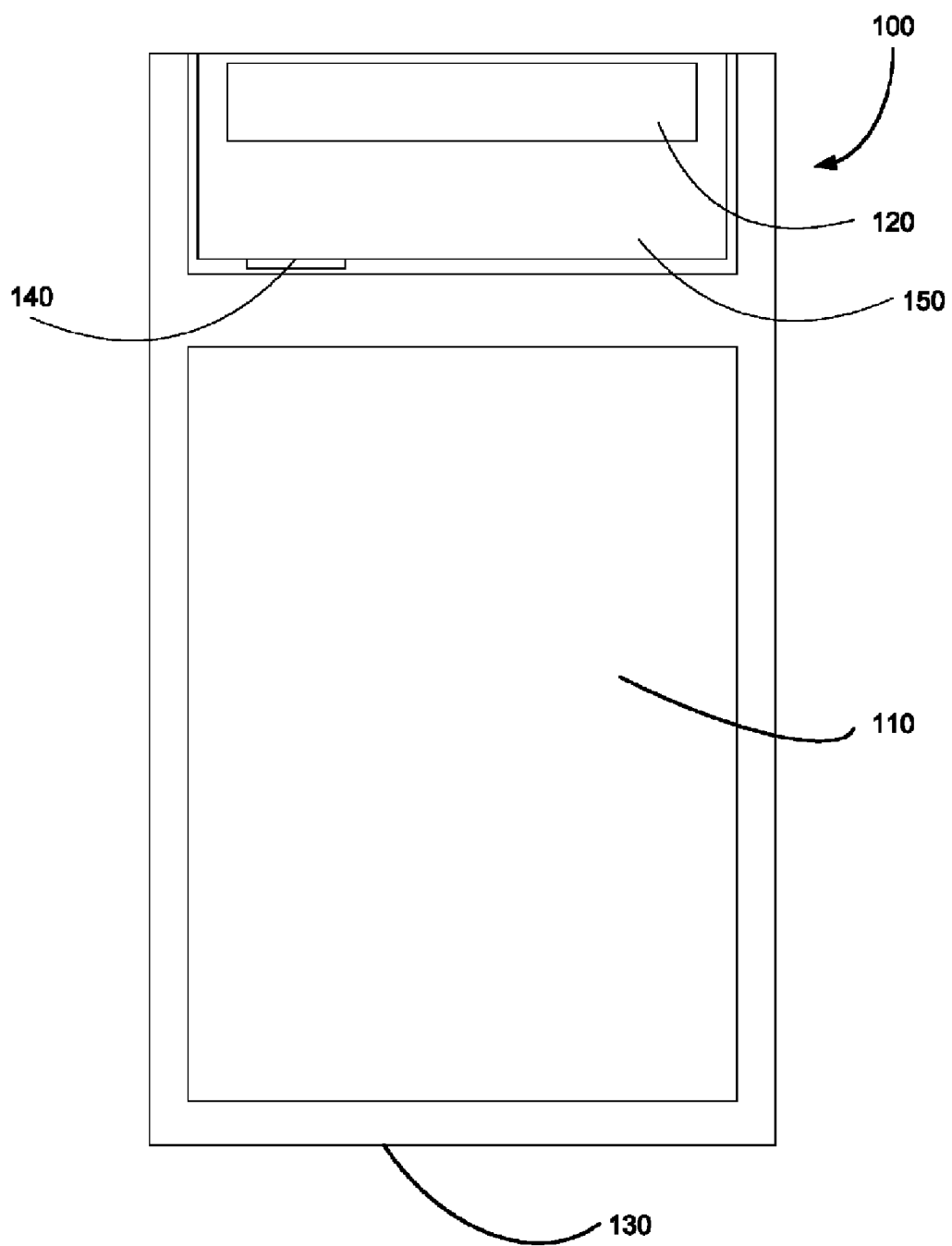
FIG. 1 is an illustration of a portable computing device.

FIG. 1 may be an illustration of a portable computing device 100. Portable computing devices 100 may be adapted to store and play a variety of file types such music files (for example, wav files, mp3 files, etc.), video files (for example, wav files, mpeg files, mpeg4 files, etc.), photo files (for example, jpeg, gif, etc.) or any other type of electronic data file. Music files are not just traditional music files but also may include podcasts, voice recordings, audio books, etc. The devices 100 may also have an FM radio, an AM radio, a satellite receiver or a TV tuner to receive broadcasts from a variety of sources. Additional features are certainly available such as a WiFi ability, ability to transmit music, photos or video to another device, ability to record voices, ability to take photos or videos, ability to make telephone calls, ability to accept GPS signals and calculate locations, ability to play video games, keep calendars, keep contacts, take notes, etc. The device 100 may an input area 110. The device 100 may also have a display 120.

In some embodiments, the device 100 may be separable into two portable devices. A first portable device 130 may include the input area 110 and an interface 140 for a second portable device 150. The second portable device 150 may contain a display 120 and an interface 140 to communicate with the first portable device 130. The second portable device 150 may contain a processor, the first portable device 130 may contain a processor or both may contain a processor.

Figure 2:
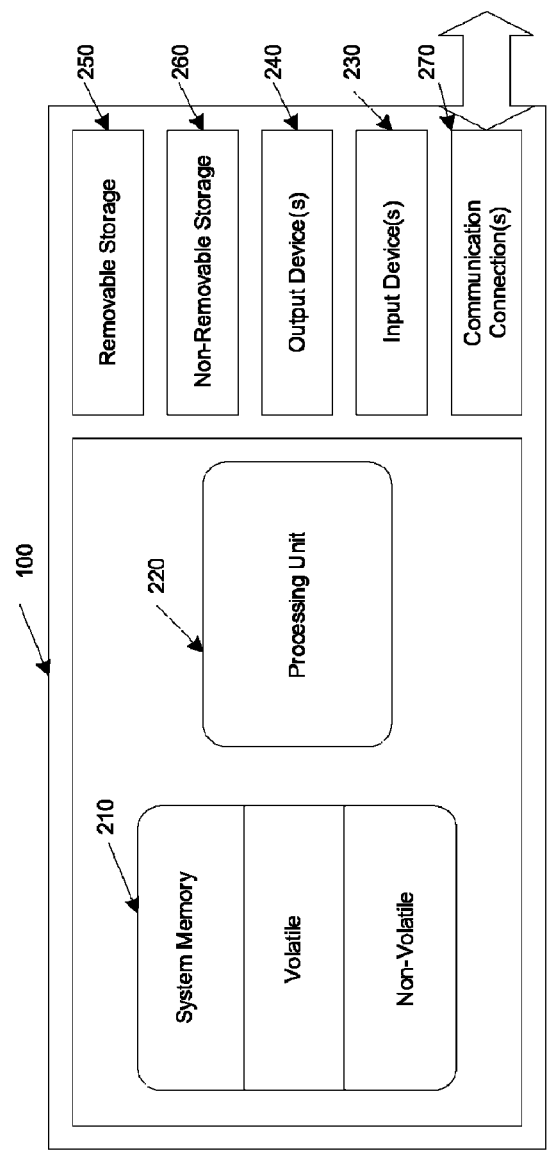
FIG. 2 is an illustration of a computing system.

FIG. 2 may be an illustration of the hardware used in the portable computing device 100. The device 100 may have a memory 210, a processing unit 220, an input area 230 such as the input area 110 (FIG. 1), an output device 240 such as a display 150 (FIG. 1) and a power source (not shown). The memory 210 may be volatile (such as RAM), non-volatile (such as ROM, flash memory, etc.) or some combination of the two.

The device 100 may also include additional storage (removable and/or non-removable) including, but not limited to, magnetic or optical disks or tape or any other memory that can be easily rewritten, may keep data for long periods of time when power is removed and may allow quick and efficient access to data. Such additional storage is illustrated in FIG. 2 by removable storage 250 and non-removable storage 260. Computer storage media includes volatile and nonvolatile, removable and non-removable media implemented in any method or technology for storage of information such as computer readable instructions, data structures, program modules or other data. Memory 210, removable storage 250 and non-removable storage 260 are all examples of computer storage media. Computer storage media includes, but is not limited to, RAM, ROM, EEPROM, flash memory or other memory technology. Any such computer storage media may be part of device 100.

The processing unit 220 may be any processing unit 220 capable of executing computer code to decode data from a compressed format into a useable form fast enough such that music and video may be played continuously without skips or jumps. It may also be useful if the processor 220 is efficient in using power to increase the life of the power source. The device 100 may also contain communications connection(s) 270 that allow the device 100 to communicate with other devices. Communications connection(s) 270 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The power source may be a battery that may be rechargeable. The power source may also be a standard battery, an input from a power converter or another portable power source. The display 120 may be a color LCD screen or other display type that fits inside the device 100.

Figure 3:
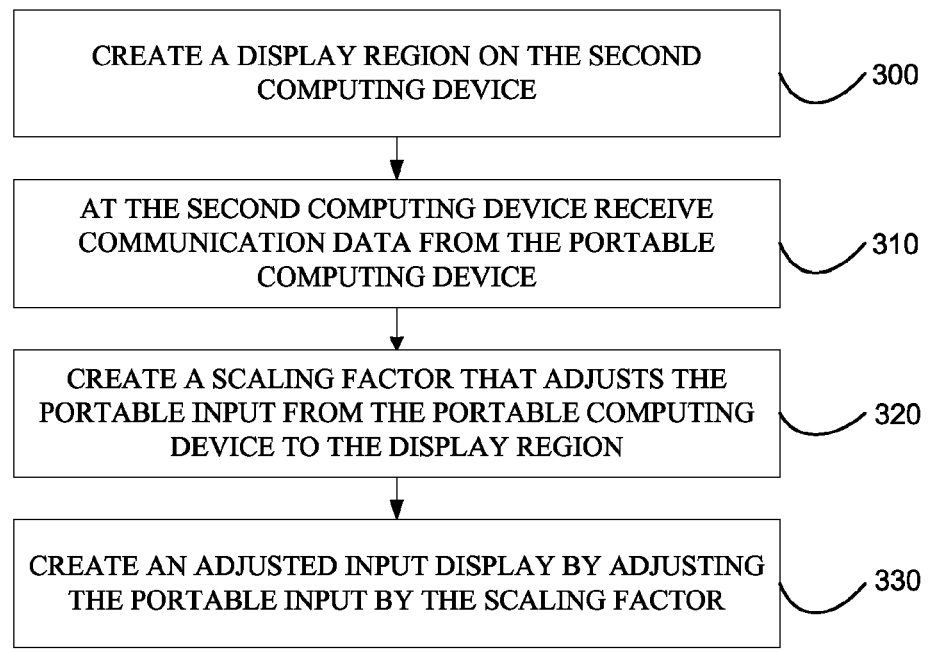
FIG. 3 is an illustration of a method of displaying data from a portable computing device on a second computing device.
Figure 5:
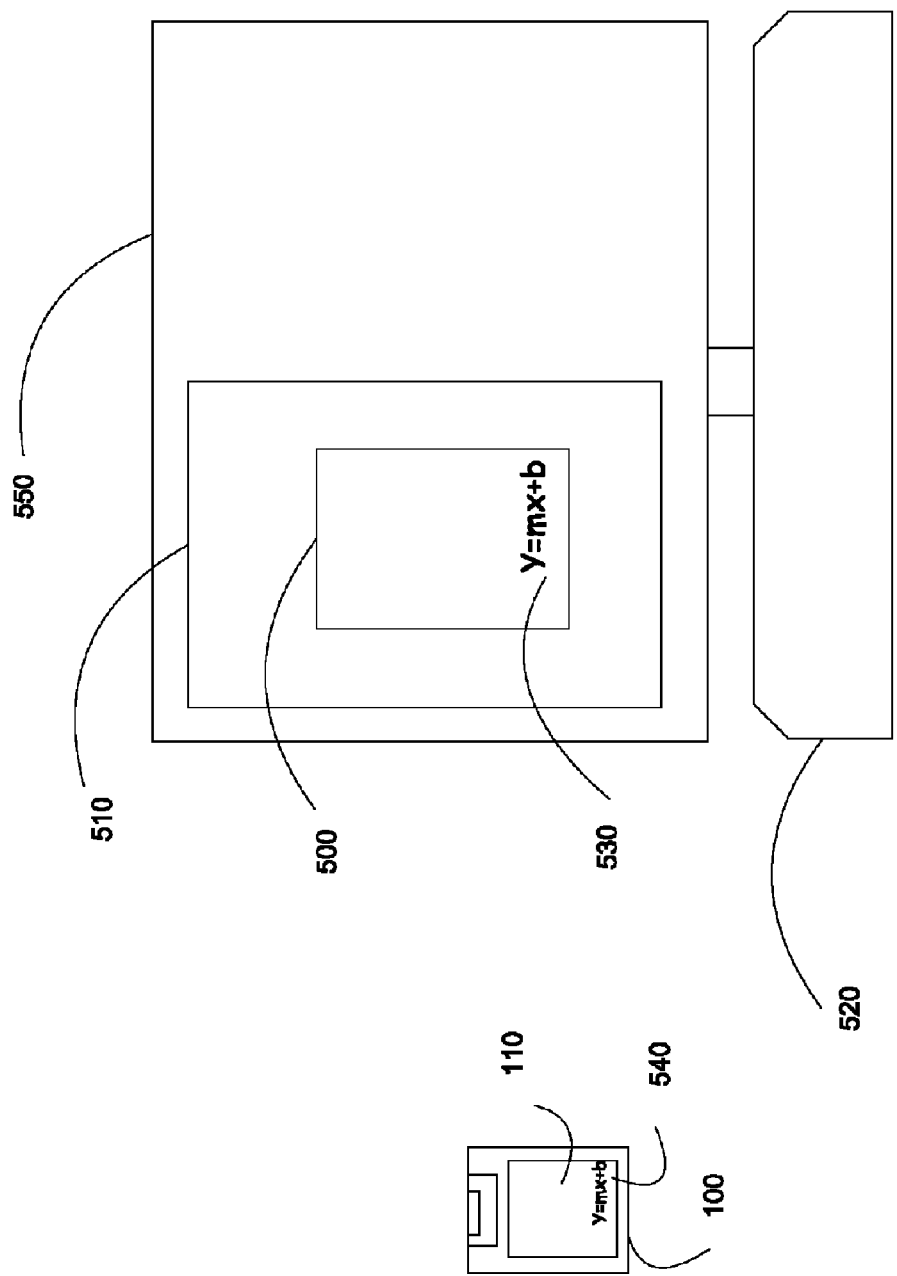
FIG. 5 is an illustration of a user interface of a portable computing device and a second computing device.

FIG. 3 is an illustration of a method of displaying input from a portable computing device 100 to a second computing device 520 (FIG. 5). The portable computing device may be a computing device such as the computing device in FIGS. 1 and 2 and the second computing device 520 may be like a traditional desktop computing device. Of course, the portable computing device 100 may be any computing device as can the computing device and are not limited by the labels "portable" or by the drawings in FIGS. 1 and 2. In one embodiment, the portable computing device 100 is a digitizing pad that accepts input and stores the input in a digital format. A user may write or draw on the digitizing input pad 110 and this portable input 540 may be stored as digital data.

At block 300, on the second computing device 520, a display region 500 may be created. The display region 500 may be inside a "traditional" application such as Microsoft Word® or Microsoft Paint® or may be in a specifically designed application to display portable input 540 from the portable computing device 100. The display region 500 may be created in a variety of ways. In one embodiment, an input device such as a mouse is used to drag and create the display region 500 of a desired size. In another embodiment, the display region 500 is created by entering numerical information that establishes the size of the region. In yet another embodiment, the size of past display regions 500 is used as a default value for future display regions 500. These are just examples and not limitations. Other manners of creating the display region 500 are possible and are contemplated.

An application 510 may be selected to display portable input 540 data from the portable computing device 100. The application 510 may be virtually any computing program that is capable of receiving inputs from a separate computing device. As an example and not limitation, a word processing program on the second computer may be configured to receive input data 540 from the portable computing device 100. The portable input 540 may be drawings or other data that is communicated to the portable computing device 100.

The portable input 540 may be communicated through the input area 110 or may be loaded as a file. The portable input 540 may have a size, such as a length and a width, and a resolution. The size may be the length of the entire input area 100 or just the area that actually contains portable input. For example and not limitation, the portable input 540 may be hand drawn notes or clip art loaded into the portable computing device 100. The portable input 540 also may be animations, movies, music or any other file or data type.

In another embodiment, the display region 500 may be created on the portable computing device 100. In one embodiment, a list of available applications is communicated to the portable computing device 100 from the second computing device 520. In some embodiments, a default application 510 is already listed in the portable computing device 100. An application 510 may then be selected to display the portable input 540. The size of the display region 500 may be set using numerals to indicate a length and a width of the display region 500. In another embodiment, a graphical tool is used to indicate the desired size of the display region 500. The portable input 540 and the display region 500 data may then be communicated to the second computing device 520. Of course, other manners of creating the display region 500 are possible and are contemplated.

At block 310, communication data may be received at the second computing device 520 from the portable computing device 100. The communication data may include a wide variety of information and may change based on a variety of factors. For example, if battery life is low, a minimum amount of data may be communicated. As another example, if a wireless communication signal is strong, additional data may be communicated.

The communication data may include data that represents the portable input 540. The data may be a "picture file" of what is displayed on the portable input 540 such as a jpeg or bmp file. In another embodiment, the file contains searchable text in the file. Of course, the file may contain virtually any relevant data. The data may contain only the part of the input pad 110 that contains data inputted by the user. In this way, the data communicated may be minimized. In another embodiment, the data may contain text that may be searchable. If the file is all text, it may be created as a text file. Of course, any appropriate file type may be used.

The form of the communication of the input may also be in a variety of forms. In one embodiment, the portable input 540 may be translated into Remote Network Device Interface Specification (RNDIS) information and may be communicated via User Datagram Protocol (UPD) packets where the UPD packets include the RNDIS information. Of course, other formats are possible and are contemplated.

At block 320, a scaling factor that adjusts the portable input 540 from the portable computing device 100 to the display region 540 may be created. In one embodiment, the scaling factor is created by dividing a size of the display region 500 by a size of the portable input pad 110 is created. The scaling factor may take on a variety of forms, may be calculated in a variety of ways and may be applied in a variety of manners. The overall goal of the scaling factor is to take the portable input 540 and either expand it or shrink it to fit the display region 500. Other concerns may be to avoid distorting the portable input 540 and ensuring that the portable input 540 is easily readable on the display device 550.

In one embodiment, a width adjustment may be calculated for adjusting a width of the portable input to properly fit the display region 500. A width of the display region 500 may be divided by a width of the portable input 540 and multiplying a width of the portable input 540 by the width adjustment. For example, if the portable input 540 width is 2 and the display region 500 is 6, the width adjustment will be 3 (6/2=3).

Similarly, a length adjustment may be calculated for adjusting a length of the portable input area 110 display to properly fit the display region 500. The length of the display region 500 may be divided by a length of the portable input 540 and multiplying a length of the portable input 540 by the length adjustment. For example, if the portable input 540 length is 3 and the display region 500 length is 12, the length adjustment will be 4 (12/3=4).

In some embodiment, the resolution of the display device 550 may be taken into account as part of the scaling factor. The resolution adjustment may adjust the resolution of the portable input 540 in view of the resolution of the display device 550. In other embodiments, the resolution of the input area 110 is taken into account. By knowing the resolution, the manner of adjusting the size and shape of the portable input 540 may be adjusted to fit the resolution.

In some embodiments, the entire portable input area 110 is as the portable input 540. In other embodiments, only the areas with user input are used as the portable input 540 which may save bandwidth and reduce the data communicated from the portable computing device 110 to the second computing device 520.

At block 330, an adjusted input display 530 may be created by adjusting the portable input 540 by the scaling factor from block 320. Again, the scaling can be accomplished in a variety of ways. In one embodiment, a scaling factor is used where the scaling factor increases or decreases the size of the portable input 540 as required to fit the display region 500. In some cases, the portable input 540 may be stretch more in one direction than the other to fit the display region 500. In another embodiment, the length and the width of the portable input 500 are adjusted using the length adjustment and the width adjustment. In another embodiment, the resolution of the input area 110 on the portable device 100 and the display 550 on the second computing device 520 are compared and a factor is used to convert the portable input 540 to the display region 500.

In some embodiments, a transform matrix is used to match the size of the portable input 540 to the size of the display region 500. For scaling (that is, enlarging or shrinking), x may be the size of the portable input 540 in the x dimension, y may be the size of the portable input 540 in the y direction and x' may be the size of the display region 500 on the second computing device 520 in the x direction and y' may be the size of the display region 500 on the second computing device 520 in the y direction, the equation may look like x'=$s_x$·x and y'=$s_y$·y where $s_x$ and $s_y$ are adjustment factors similar to the length and width factors. The transform matrix form would be:

$$\begin{bmatrix} x' \\ y' \end{bmatrix} = \begin{bmatrix} s_x & 0 \\ 0 & s_y \end{bmatrix} \begin{bmatrix} x \\ y \end{bmatrix}$$

In some embodiments, the scaling factor can be adjusted by a multiplier. This multiplier may be selectable. In this way, select parts of the portable input may be reduced or enlarged.

When the portable input 540 is converted to adjusted input 530, it may be displayed in a variety of ways. In one embodiment, the adjusted input display 530 is used as mouse display input data. In other words, the adjusted input display 530 directs a virtual mouse to draw in the display region 500 as if drawing with a mouse. In another embodiment, the data is converted into a bitmap which is displayed in the display region 500.

Figure 4:
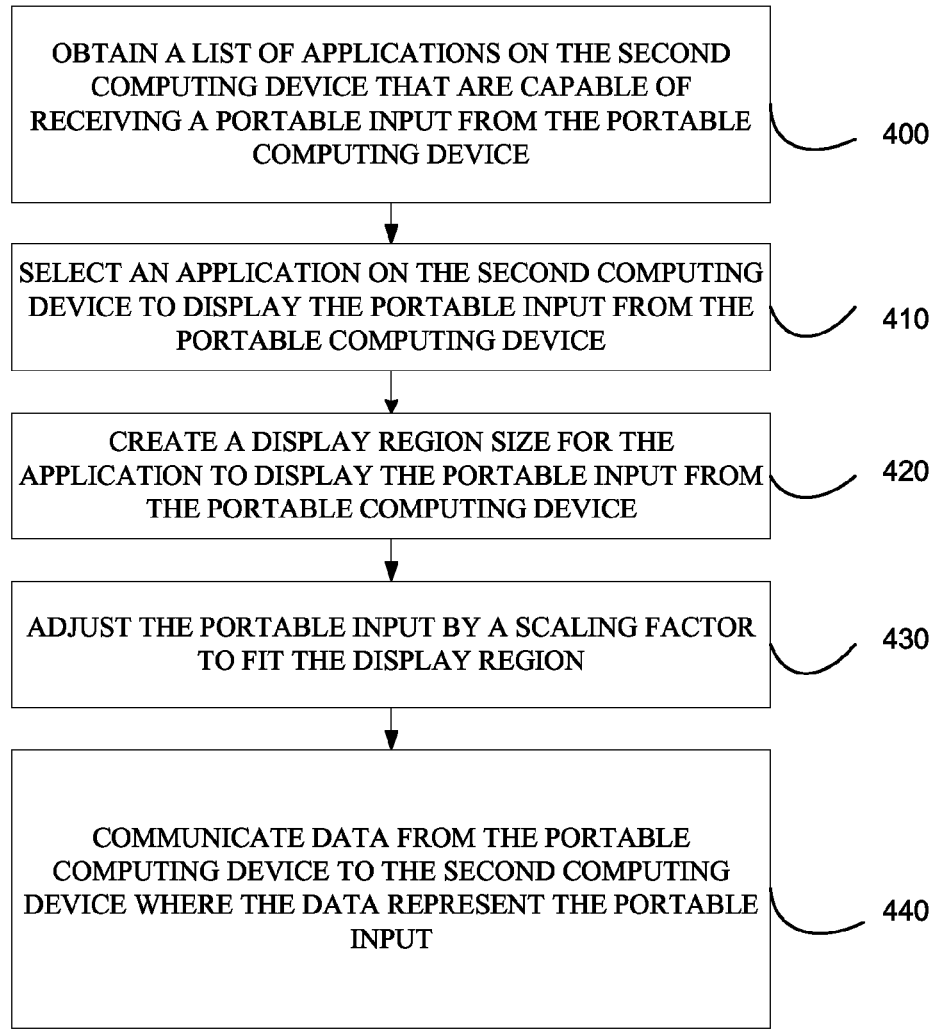
FIG. 4 is an illustration of another embodiment of a method of displaying data from a portable computing device on a second computing device.

Of course, much of the described method could also take place on the portable computing device 100. FIG. 4 illustrates a possible embodiment. At block 400, a list of applications on the second computing device 520 may be obtained that are capable of receiving a portable input 540 from the portable computing device 100. The communication of the applications may be in response to a request or the applications may be pushed to the portable computing device 100.

At block 410, an application on the second computing device 520 may be selected to display the portable input 540 from the portable computing device 100. The application may be selected from the list received at block 400 or may be from a list of applications received previously.

At block 420, a display region 500 size may be created for the application to display the portable input 540 from the portable computing device 100. The size may be a length and a width and it may include a resolution element.

At block 430, the portable input 540 may be adjusted by a scaling factor to fit the display region 500. The scaling factor may be a width adjustment for the display region 500 which may be calculated by taking a width of the display region 500 and dividing it by a width of the portable input 540 to create the width adjustment. The scaling factor also may include a length adjustment which may be calculated by taking a length of the display region 500 and dividing it by a length of the portable input 540. A resolution factor also may be created to match the resolution from the portable computing input area 110 to the display 550 on the second computing device 520.

At block 440, data may be communicated from the portable computing device 100 to the second computing device 520 where the data represent the portable input 540. As described previously, the data may be communicated in a variety of forms and in a variety of ways.

FIG. 5 is an illustration of the results of the method. FIG. 5, a display region 500 is created in an application 510 on the second computing device 520. On the portable computing device 100, a corner of the input pad 110 has portable input 540. The portable input 540 on portable computing device 100 is communicated to the second computing device 520 where the portable input 540 is displayed as the adjusted input display 530 in a corner of the display region 500, but in an increased scale.

In the past, a communication from a portable computing device 100 would take up the entire display 550 of the second computing device 520, including multiple displays 550 if the second computer had multiple displays. As a result, the portable input 540 was often so large as to be unreadable and unmanageable. In the method, the size of the display region 500 on the second computing device 520 can be controlled such that the portable input 540 does not overtake the entire display (or displays) 550 of the second computing device 520. In addition, even when received inside a specific application 510, a display region 500 may be created inside the application 510 such that the portable input will be converted to an adjusted input display 530 that does not dominate the entire application 510 but stays in the designated display region 500. A benefit is that data from a portable computing 100 device such as a digitizer is more useful as the size of the input is controllable.

The invention claimed is:

1. A method of displaying portable input from a portable computing device to a second computing device comprising:
   on the second computing device,
      creating a display region on a display of the second computing device to display the portable input from the portable computing device;
      receiving communication data from the portable computing device wherein the communication data comprises data that represents the portable input, the portable input corresponding to at least a part of an input area of the portable computing device;
      calculating a scaling factor that adjusts the portable input from the portable computing device by dividing a size of the display region by a size of the portable input;
      creating an adjusted input display by adjusting the portable input by the scaling factor;
      displaying the adjusted input display in the display region on the display of the second computing device.

2. The method of claim 1, further comprising obtaining the resolution of the display on the second computing device and using the resolution to calculate the scaling factor.

3. The method of claim 2, wherein calculating a scaling factor further comprises creating a transform matrix to scale the portable input to fit the display and resolution on the second computing device.

4. The method of claim 1, wherein the portable input is digitized input from a portable computing device.

5. The method of claim 1, further comprising selecting an application on the second computing device to display the portable input from the portable computing device.

6. The method of claim 1, wherein the scaling factor can be adjusted by a multiplier.

7. The method of claim 1, further comprising receiving the communication data in the form of Remote Network Device Interface Specification (RNDIS) information.

8. The method of claim 7, further comprising receiving User Datagram Protocol (UPD) packets from the portable computing device wherein the UPD packets comprise RNDIS information.

9. A computer storage medium comprising computer executable instructions for displaying portable input from a portable computing device to a second computing device to be executed by a processor, the computer executable instructions comprising instructions for:
   on the second computing device,
      selecting an application on the second computing device to display the portable input from the portable computing device;
      creating a display region in the application to display the portable input from the portable computing device wherein the display region comprises a length, a width and a resolution;
      receiving communication data from the portable computing device, the communication data comprising data that represents the portable input, the portable input corresponding to a part of an input area of the portable computing device, the part of the input area of the portable computing device excluding a second part of the input area, the second part including no user input;
      calculating a width adjustment for adjusting a width of the portable input to properly fit the display region by taking a width of the display region and dividing it by a width of the portable input;
      calculating a length adjustment for adjusting a length of the portable input to properly fit the display region by taking a length of the display region and dividing it by a length of the portable input;
      calculating a resolution adjustment for adjusting the resolution of the portable input in view of the resolution of the display device;
      creating an adjusted data display by adjusting the width of the portable input by the width adjustment; by adjusting the length of the portable input by the length adjustment; and adjusting the resolution by the resolution adjustment; and
      displaying the adjusted application data display in the display region inside the application on the second computing device.

10. The computer storage medium of claim 9, wherein calculating the length adjustment, the width adjustment and the resolution adjustment further comprises creating a transform matrix to scale the portable input to fit the display and resolution on the second computing device.

11. The computer storage medium of claim 9, wherein the width and length adjustments can be adjusted by a multiplier.

12. The computer storage medium of claim 9, further comprising receiving the communication data in the form of Remote Network Device Interface Specification (RNDIS) information.

13. The computer storage medium of claim 12, further comprising receiving User Datagram Protocol (UPD) packets from the portable computing device wherein the UPD packets comprise RNDIS information.

14. A method of displaying input from a portable computing device to a second computing device comprising:
   on the portable computing device,
      obtaining a list of applications on the second computing device capable of receiving a portable input from the portable computing device;
      selecting an application resident on the second computing device to display the portable input from the portable computing device;
      creating an display region size for the application to display the portable input from the portable computing device wherein the size comprises a length and a width; and
      communicating data from the portable computing device to the second computing device wherein the data comprises data representing the portable input.

15. The method of claim 14, further comprising:
   creating a width adjustment for the portable input by taking a width of the display region and dividing it by a width of the portable input;
   creating a length adjustment by taking a length of the display region and dividing it by a length of the portable input;

creating a resolution adjustment by comparing the resolution of the portable input to the resolution of a display of the second computing device; and communicating the width adjustment, the length adjustment and the resolution adjustment to the second computing device.

16. The method of claim 15, wherein the resolution adjustment being done based on resolution of an input area of the portable computing device.

17. The method of claim 14, further comprising communicating the data in the form of Remote Network Device Interface Specification (RNDIS) information.

18. The method of claim 17, further comprising communicating User Datagram Protocol (UPD) packets from the portable computing device wherein the UPD packets comprise the RNDIS information.

19. The method of claim 14, wherein the communication data varies based on battery life of the portable computing device.

20. The method of claim 14, wherein the communication data varies based on a wireless communication signal strength between the portable computing device and the second computing device.

* * * * *